UNITED STATES PATENT OFFICE.

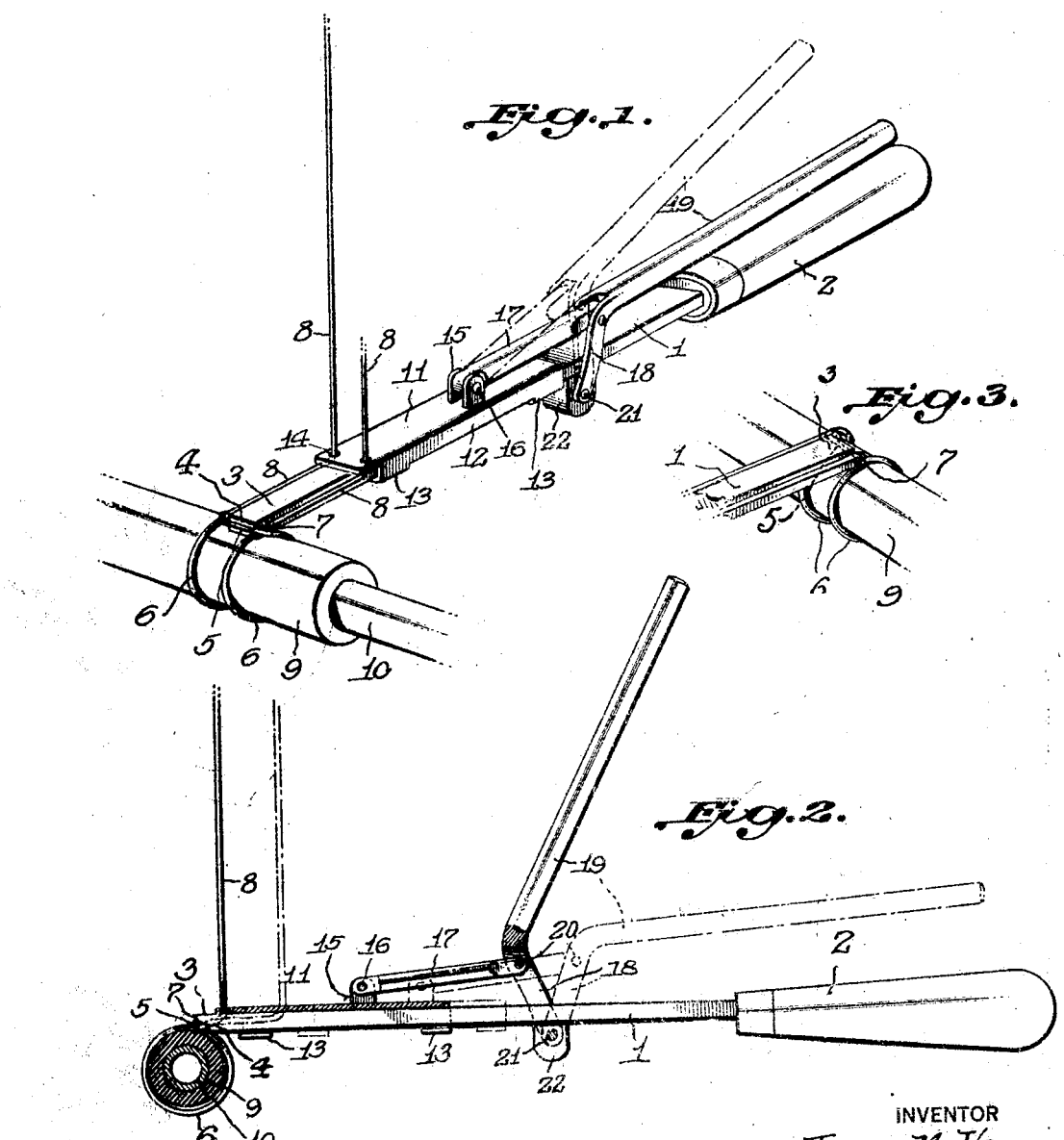

JAMES McVAY, OF RIVER ROUGE, MICHIGAN.

WIRE-BENDING TOOL.

1,380,323.  Specification of Letters Patent.  Patented May 31, 1921.

Application filed March 18, 1920. Serial No. 366,974.

*To all whom it may concern:*

Be it known that I, JAMES McVAY, a citizen of the United States of America, residing at River Rouge, in the county of Wayne and State of Michigan, have invented certain new and useful Improvements in Wire-Bending Tools, of which the following is a specification, reference being had therein to the accompanying drawings.

This invention relates to a wire bending tool, and has special reference to a tool that may be advantageously used for bending and clamping a wire member on a hose or other yieldable and flexible conduit, so that the member or conduit may be clamped and anchored relative to another member, for instance as when attaching the end of a hose to a nozzle or coupling member. It is the present practice to wrap wire or a similar binder about the end of a hose to clamp and anchor it on a coupling member so that there will be a non-leakable connection established. Sometimes the wire is in the form of yokes or loops bent about the hose, and to secure the wire yokes or loops taut on the hose it is necessary to use pliers or special tools. Even then the wire may not be positively anchored and with portions thereof loose there is liable to be a leak between the hose and its coupling member.

My invention aims to provide a wire bending tool by which a wire yoke may be manipulated relative to a piece of hose and drawn taut thereon so as to bind the hose on a coupling or other member. The tool includes a slide head and novel means for moving the head, with the head constructed to receive the ends of a piece of wire so that said wire ends will be held while a fixed head of the tool engages another portion of the wire. The slide head of the tool can be shifted to draw the wire taut and it is possible to twist or clench the wire so that the ends thereof will be positively anchored relative to other portions of the wire.

The above and other features of my invention will be hereinafter brought out and specifically claimed, and reference will now be had to the drawing, wherein—

Figure 1 is a perspective view of the tool showing the manner of drawing wires taut;

Fig. 2 is a side elevation of the same, partly broken away and partly in section, and Fig. 3 is a perspective view of a portion of the tool, showing the manner of bending the taut wires.

The tool comprises a flat oblong bar 1 having a handle 2 at its inner end and at the outer end of said bar is a head 3 having its end face provided with a transverse groove 4 to receive the yoke portion 5 of a piece of wire or clamp having loops 6 with the ends thereof carried through the yoke portion 5 and bent, as at 7, so that the ends 8 of the wire yoke may be clenched, twisted or otherwise treated to prevent the ends of the wire from slipping after the wire yoke has been drawn taut about a piece of hose 9 and a coupling member or nozzle 10 therein. The head 3 may be considered as the end of the bar 1 and with said head comparatively flat and the groove 4 intermediate the transverse edges of said head it is possible to place the head 3 in engagement with the hose 9 so that the groove 4 will be in proximity to the outer wall of the hose, and thus permit of the yoke portions 5 of the piece of wire being gripped while the loop portions 6 are about the hose.

On the bar 1 is a slide head 11 having side walls 12 with inturned lugs 13 at the ends thereof and the walls and lugs of said head prevent displacement thereof during a sliding movement of the head on the bar 1. At the outer end of the head 11 are side openings 14 and it is through these openings that the ends 8 of the wire are threaded so that when the slide head is retracted on the bar 1 the ends of the wire may be drawn through the yoke portion 5 to make the loop portions 6 taut about the hose 9 and thereby clamp the hose on the member or coupling 10.

On the head 11, intermediate the ends thereof, are apertured lugs 15 and pivotally mounted between said lugs by a pin 16 is the outer end of a link 17, which has its rear end pivotally mounted in the bifurcated end 18 of a lever 19 by a pin 20. The bifurcated end 18 of the lever 19 is pivotally connected, by a transverse pin or rivet 21, to a lug 22 carried by the lower face of the bar 1, and with the bifurcated end 18 disposed at an angle to the lever 19, it is possible to set the lug 22 so that the slidable head 11 will have a long stroke on the bar 1, and the lever 19 swung into parallelism with the handle 2. With the handle 2 held in one hand and the lever 19 manipulated by the other hand, it is possible to reciprocate the slide head on the bar 1, and thus position the slide head so that the wire may be threaded through the openings 14 and the wire drawn taut.

The wire used as hose clamps is generally carried by a large spool and without severing the wire relative to the spool it is possible to carry the free end of the wire through one of the openings 14, bend it about the hose to provide one loop, then another bend to form the yoke portion 5, and still another bend to form the other loop portion 6. In doing this the wire is bent at the yoke portion 5 and the end of the wire may be carried through the remaining opening 14. Now, with the head 3 of the tool in engagement with the yoke portion 5, the wire may be drawn taut so that the loop portions 6 are bound about the hose, as shown in Fig. 1.

With the slide head 11 at the head 3 and the wire threaded in the openings 14 the lever 19 may be shifted toward the handle 2 to retract the slide head and thus draw the wire taut. By then bodily swinging the tool over the hose, to the position shown in Fig. 3, the wire will be bent at the yoke portion 5, as indicated at 7 and then the wire of the spool may be cut, the ends of the wire removed from the slide head and clenched, twisted or otherwise fixed so as not to slip through the yoke portion 5.

The operation recited above is facilitated by using the yoke portion 5 as a fulcrum for the head 3 and swinging the bar completely over the hose, considering Fig. 2, thus bending the ends of the wire about the yoke portion and when sufficiently bent the hooks formed by the ends of the wire cannot become dislodged and will firmly hold the loop portions 6 taut about the hose. After the rear end of the link 17 has been carried over the pivot of the lever 19 it is apparent that considerable leverage is possible for further shifting the slide head 11 to draw the wire taut, and a person familiar with the operation of the tool may quickly clamp wires upon a hose to bind the hose on a coupling. The tool may therefore be advantageously used for repairing train line air hose without necessarily sending the hose to a shop for repair.

It is thought that the operation and utility of my tool will be apparent without further description, and while in the drawing there is illustrated a preferred embodiment of my invention, it is to be understood that the structural elements are susceptible to such variations and modifications as fall within the scope of the appended claims.

What I claim is:—

A tool of the type described comprising a bar having a groove at its outer end adapted to engage a wire yoke having wire ends extending through the yoke to form loop portions adapted to be drawn taut, a slide head on said bar and of greater width than said bar and having openings at its outer end and adjacent the side edges of said bar to receive the wire ends of said yoke, a lever having a bifurcated end supported from the one face of said bar, and a link connecting said lever to said slide head for shifting said slide head on said bar so that the wire ends in the outer end of said slide head may be drawn taut by movement of said slide head on said bar, said wire ends being bent relative to said yoke by bodily swinging said tool through an arc relative to said yoke.

In testimony whereof I affix my signature in the presence of two witnesses.

JAMES McVAY.

Witnesses:
O. F. BARTHEL,
ANNA M. DORR.